United States Patent [19]

Burtis

[11] 4,446,695
[45] May 8, 1984

[54] AIRCRAFT PROPULSION ASSEMBLY

[76] Inventor: Wilson A. Burtis, 5011 Havard Ave., Westminster, Calif. 92683

[21] Appl. No.: 318,759

[22] Filed: Nov. 6, 1981

Related U.S. Application Data

[63] Continuation-in-part of Ser. No. 81,579, Oct. 3, 1979, abandoned.

[51] Int. Cl.³ .............................................. F02K 5/00
[52] U.S. Cl. .................................. 60/200.1; 60/269; 239/DIG. 7
[58] Field of Search ...................... 60/200.1, 221, 264, 60/265, 269, 271; 415/212 A, 213 C, DIG. 1; 239/265.17, DIG. 7

[56] References Cited

U.S. PATENT DOCUMENTS

| | | | |
|---|---|---|---|
| 2,084,462 | 6/1937 | Stalker | 415/DIG. 1 |
| 2,265,737 | 12/1941 | McMahan | 415/DIG. 1 |
| 3,000,178 | 9/1961 | Logerot | 239/265.17 |
| 3,047,208 | 7/1962 | Coando | 415/DIG. 1 |
| 3,370,794 | 2/1968 | Drewry et al. | 239/265.17 |

FOREIGN PATENT DOCUMENTS

| | | | |
|---|---|---|---|
| 57029 | 12/1912 | Austria | 415/DIG. 1 |
| 1060291 | 3/1954 | France | 239/265.17 |

Primary Examiner—Louis J. Casaregola
Attorney, Agent, or Firm—William C. Babcock

[57] ABSTRACT

An aircraft propulsion assembly in which a prime mover drives a rotating air stream generating element, situated in a generally circular housing that supports a ring shaped stator in which a number of circumferentially spaced slots are defined. An elongate nozzle is axially aligned with the rotating element, which nozzle on the forward end in cooperation with the housing defines a circular plenum chamber that is in communication with the slots. The plenum chamber on an inner portion thereof cooperates with the stator to define a circular aperture. A first portion of the air stream generated by the rotating element flows rearwardly through the nozzle and a second portion through the slots in to the plenum chamber to be compressed. The compressed air excapes from the plenum chamber through the circular aperture, and due to the Coanda effect flows along the interior surface of the nozzle as a cylindrical sheath at a higher velocity than the first portion of the air stream flowing rearwardly through the nozzle. As a result, the first portion of the air stream is not subjected to any appreciable drag resistance and exits from the nozzle at maximum velocity to impart maximum forward thrust to the assembly.

6 Claims, 3 Drawing Figures

AIRCRAFT PROPULSION ASSEMBLY

REFERENCE TO RELATED APPLICATION

The present invention is a continuation in part of my application filed Oct. 3, 1979, Ser. No. 81579 entitled "Improved Aircraft Propulsion Structure" (abandoned).

BACKGROUND OF THE INVENTION

1. Field of the Invention

Aircraft Propulsion Assembly.

2. Description of the Prior Art

A Rumanian born engineer Coanda discovered some years ago that a fluid flow phenomena occured when fluid is ejected rapidly over the lip of an orifice into a moving stream of fluid, which results in a lowering of the co-efficient of drag of the fluid stream.

A major object of the present invention is to provide an aircraft propulsion assembly that takes advantage of the Coanda effect to increase the thrust generated by a rearwardly moving stream of air, by increasing the velocity of the rearwardly moving stream without increasing the power of the prime mover that generates the air stream.

Another object of the invention is to supply a power driven rotating air stream generating element that rotates within a circular housing, with a first portion of the air stream being directed rearwardly through the nozzle, and a second portion of the air stream through a series of circumferentially spaced slots into a plenum chamber. The second portion of air discharged into the plenum chamber is compressed and discharges through an orifice in the plenum chamber into the forward portion of the nozzle at a higher velocity than the first portion of the rearwardly moving air stream. The second portion of the air forms a sheath of air within the nozzle that is moving rearwardly therein at a higher velocity than the first portion of air, and as a result the drag imposed on the rearwardly moving first portion of air is reduced to a minimum, and the first portion of air discharges from the nozzle at maximum velocity to provide maximum thrust to the assembly. The air stream generating element not only provides the first portion of air that is directed rearwardly through the nozzle for thrust generating purposes, but also the compressed air in the plenum chamber that escapes therefrom at a higher velocity and due to the Coanda effect insulates the first portion of air from drag resistance in moving rearwardly through the nozzle to increase the efficiency of the thrust generated by the assembly.

SUMMARY OF THE INVENTION

An aircraft propulsion system in which a power driven rotating element situated within a frame generates a rearwardly moving air stream that has a first portion that flows directly into the forward end of a nozzle, and a second portion that flows through a number of spaced slots defined in the outer portion of a ring shaped stator into a circular plenum chamber located on the forward end of the nozzle. The air entering the plenum chamber through the slots is compressed and escapes from the plenum circular orifice into the forward end of the nozzle. The compressed air exits into the forward end of the nozzle from the orifice at a substantially higher velocity than the first portion of the air. The compressed air due to the Coanda effect travels rearwardly along the interior surface of the nozzle as a cylindrical sheath that has a higher velocity than the first portion of the rearwardly moving air. The first portions of the rearwardly moving air due to the Coanda effect is subjected to a minimum of drag, and as a result exits from the nozzle at maximum velocity to impart maximum forward thrust to the assembly.

DESCRIPTION OF THE PREFERRED EMBODIMENT

Figure 1:
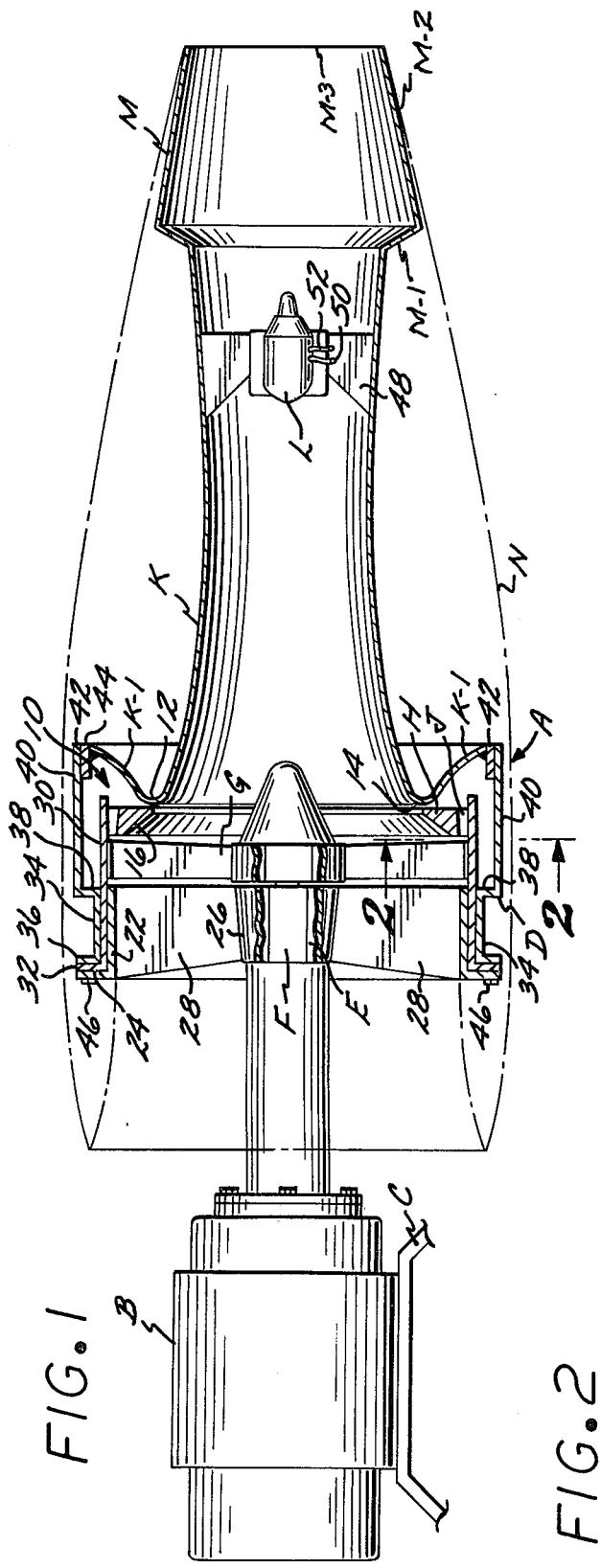
FIG. 1 is a side elevational view of the aircraft propulsion system.

The assembly A as may be seen in FIG. 1 includes a prime mover B, either an electric motor, internal combustion engine, turbine or the like that is supported by conventional frame means C in a fixed relation to a circular housing D. The housing D on the forward end includes a bearing assembly E through which a drive shaft F from the prime mover B extends rearwardly to drive an air stream generating rotatable element G.

A ring shaped stator H is provided as shown in FIG. 1 that has a number of circumferantially spaced slots J defined on the exterior thereof.

A tubular nozzle K is provided that has a forward end portion K-1 that extends outwardly and partially defines a plenum chamber 10 of circular configuration, which plenum chamber has an inner portion 12 that is adjacently disposed to the inner portion of the stator H, and cooperates therewith to define a ring shaped orifice 14. The stator H has a circular ring shaped interior surface 16 that extends downwardly and rearwardly. When the air stream generating rotatable element G is driven, it generates a rearwardly moving air stream, with a first portion 18 of the air stream as shown in FIG. 3, being directed into the forward portion of the nozzle K, and a second portion of the air stream 20 flowing through the slots J into the plenum chamber 10 to be compressed.

Figure 3:
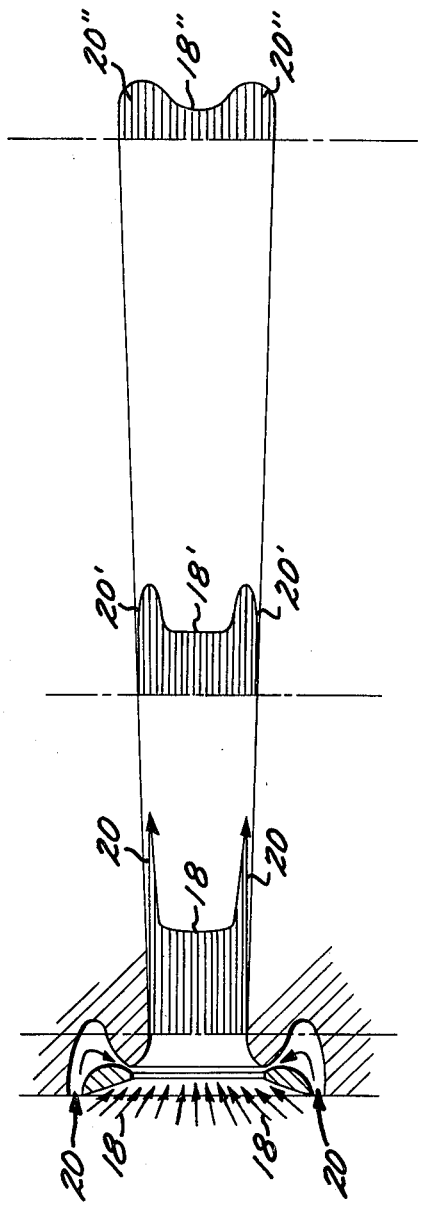
FIG. 3 illustrates diagrammatically by length the relative velocities between the centrally moving first air stream and that of the compressed air from the plenum chamber as the two move rearwardly in the nozzle, and illustrating that the two streams of air are approaching substantially the same velocity as they exit from the nozzle.
Figure 2:
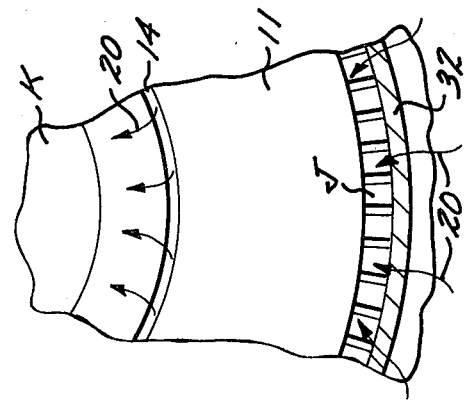
FIG. 2 is a fragmentary transverse cross sectional view of the invention taken on the line 2—2 of FIG. 1.

The second portion 20 of the air stream that has been compressed in the plenum chamber 10 flows through the orifice 14 and due to the Coanda effect follows the interior surface of the nozzle K and is shown in FIG. 3 as moving rearwardly at a substantially greater velocity than the first portion 18 of the rearwardly moving air stream.

The second portion 20 of the air stream is in effect a rearwardly moving cylindrical sheath that follows the interior surface of the tubular nozzle K and isolates the second portion 18 of the air stream therefrom. As a result, the first portion 18 of the air stream is subjected to minimum drag in moving rearwardly through the nozzle K. In FIG. 3 it will be seen that initially the second portion of the air stream 20 is moving at a substantially greater velocity than the first portion 18, but after the two air streams have reached an intermediate position in the nozzle K, the second portion of the air stream has slowed down in velocity relative to the first portion 18, due to the second portion being in frictional drag contact with the interior surface of the nozzle K.

The first and second air stream portions above mentioned are identified in FIG. 3 at intermediate positions in nozzle K by the numerals 18' and 20'. By the time the two air streams are exiting from the nozzle, the first air stream 18 and second air stream 20 have intermingled and the second air stream moving but slightly faster than the first air stream. In FIG. 3 the two above mentioned air streams as they exit from nozzle K are identified by c the numerals 20" and 18'.

The housing D is illustrated in FIG. 1 as being defined by a first cylindrical shell 22 that on the forward end has a circular first flange 24 extending outwardly therefrom. A bearing 26 is provided that rotatably engages the drive shaft F, with the bearing having a number of legs 28 extending radially therefrom that are secured to the interior surface of the shell 22.

A second cylindrical shell of greater length than the first shell 22 is shown in FIG. 1, which second shell engages the first shell, and is supported thereon. The second cylindrical shell has a forwardly disposed second flange 32 that is in abutting contact with the first flange 24. The second shell on the rearward interior portion supports the stator H.

A third cylindrical shell 34 is also provided that engages the second shell 30, with the third shell having a flange 36 on the forward end thereof, that is in abutting contact with the second flange 32. The third shell 34 includes a circular lip 38 that extends outwardly therefrom and develops into a fourth rearwardly extending cylindrical shell 40 that has an end portion 42. A ring 44 is secured to the interior of the rear portion 42 and has the forward portion K-1 of the nozzle that is of curved configuration secured thereto.

The forward nozzle portion K-1 of fourth cylindrical shell 40, circular lip 38, and the rearward portion of the second cylindrical shell 30 cooperate to define the plenum chamber 10. The first, second and third flanges 24, 32 and 36 are removably secured together by bolts 46 or other suitable fastening means.

An after burner L is shown in FIG. 1 disposed in the rearward portion of the nozzle K and supported by a number of circumferential spaced radially extending legs 48 that are secured to the interior surface of the nozzle. An air line and fuel line 50 and 52 extend to the after burner L as shown in FIG. 1. The after burner L serves to accelerate the velocity of the rearwardly moving stream of air 18 and 20, with the air after being heated by the after burner discharging through a diverging and converging thrust chamber M. The assembly above described may be disposed in a hollow pod N which is indicated in FIG. 1 in phantom line. In FIG. 1 it will be seen that the plenum chamber 10 is of substantial capacity so that when it is filled with compressed air there will be a smooth discharge of the latter through the circular orifice 14 to serve the purpose previously described in detail.

From the experience it has been found that the pressure of the second air stream 20 should be substantially two and one half times greater than that of the first air stream 18 to obtain the improved thrust characteristics above described.

From the previous description it will be seen that the rotating element G generates an air stream that is directed rearwardly in the nozzle K, with the air stream being subdivided into a first portion 18 that flows directly and longitudinally through the nozzle K, and a second portion that enters the plenum chamber 10 through the slots J. The air in the plenum chamber 10 is compressed and escapes therefrom through the orifice 14. The air stream discharging from the orifice 14 is of a pressure of at least two and one half times greater than that of the first portion 18 of the rearwardly moving air stream.

The second portion 20 of the air stream discharging from the orifice 14 is travelling at a substantially higher velocity than the first portion 18 as is evident in FIG. 3. The pressure exerted by the first portion 18 on the second air stream portion 20 is greater than that adjacent the interior surface of the nozzle K, and as a result the second air stream flows adjacent the interior surface.

The after burner L heats the rearwardly moving air stream portion 18 and tends to expand the same, and in so doing increasing the velocity as it enters the thrust chamber M.

The first and second portions 18 and 20 that have been heated prior to entering the thrust chamber M expand in entering the diverging portion M-1 thereof and in so doing exert a forward thrust thereon. The portions 18 and 20 in flowing through the conveying portion M-2 of the thrust chamber M have the rearward velocity thereof increased and be at a maximum at the thrust chamber exit M-3. The exit M-3 by conventional means (not shown) may be varied in transverse cross sectional area.

The second air stream 20 isolates the first portion 18 of the air stream from the interior of the nozzle K. The first rearwardly moving portion 18 of the air stream is subjected to a minimum of frictional resistance in flowing rearwardly through the nozzle, and discharges at a greater velocity than would be achieved if the second portion 20 of the air stream was not flowing longitudinally and rearwardly along the interior surface of the nozzle K. The relative velocity of the first and air stream portions 18 and 20 are shown graphically in FIG. 3, both at forward end portion of the nozzle K, at an intermediate position therein, and as the two air stream portions exit from the nozzle. Thus the invention provides an increased thrust for the propulsion assembly, but without requiring additional power from the prime mover that rotates the air stream generating element.

The use and operation of the invention has been previously described, and need not be repeated.

What is claimed is:

1. An aircraft propulsion assembly that includes:
    a. a tubular nozzle that has a rear end and a forward end portion that extends outwardly and rearwardly;
    b. a generally cylindrical housing assembly that has a forward and rearward end, said forward end portion of said nozzle secured to said rearward end of said housing and cooperating therewith to define a plenum chamber; a ring shaped stator supported in said housing and cooperating with said forward end portion of said nozzle to define a circumferentially extending orifice, said stator having a plurality of circumferentially spaced slots therein that are in communication with said plenum chamber; a bearing disposed in a fixed position in said housing; and a power driven shaft rotatably supported in said bearing; and
    c. a rotatable air stream generating element disposed in said housing forwardly of said stator and driven by said shaft, said air stream generating element when rotated generating a first portion of a rearwardly moving air stream that discharges directly into said nozzle to flow rearwardly therethrough to impart forward thrust to said propulsion assembly, and a second portion of a rearwardly moving air stream that flows through said slots into said plenum chamber to be compressed and discharge through said circular orifice at a pressure greater than that of said first portion, said second portion of air flowing from said orifice flowing rearwardly in said nozzle adjacent the interior surface thereof at a velocity greater than said first portion and substantially insulating said first portion from frictional drag and intermingling with said first portion as said first and second portions move rearwardly through said nozzle, with said first portion exiting from said rearward end of said nozzle at a higher velocity than if said second portion were not present, and increasing the thrust generated by said first portion without increasing appreciably the power required to rotate said air stream generating element.

2. An aircraft propulsion assembly as defined in claim 1, which in addition includes:
   d. a plurality of circumferentially spaced legs secured to said bearing and extending radially therefrom, said legs secured to the interior of said housing.

3. An aircraft propulsion assembly as defined in claim 2, in which said air stream generating element is a plurality of circumferentially spaced blades that extend radially from said power driven shaft with said blades extending outwardly to terminate in end portions disposed forwardly of said slots in said stator.

4. An aircraft propulsion assembly as defined in claim 3, in which said ring shaped stator has an interior peripheral surface that slopes inwardly and rearwardly to effect a stream line flow of said first portion of said air stream into the forward portion of said nozzle.

5. An aircraft propulsion assembly as defined in claim 2, in which said housing includes first, second and third cylindrical shells concentrically disposed and of increasing length, said first shell having said legs of said bearing secured thereto, said second shell having a rearward interior portion in which said stator is supported, and said third shell having a rearward portion to which said forward portion of said nozzle is secured, and means for removably maintaining said shells in fixed longitudinal relationship.

6. An aircraft propulsion assembly as defined in claim 1, in which said circular orifice is of such width that said second portion of said air stream discharged into said plenum chamber to be compressed discharges through said circular orifice at a pressure of at least two and one half times the pressure of said first portion of said rearwardly moving air stream in said nozzle.

* * * * *